United States Patent
Altounian (10) Patent No.: US 8,220,983 B2
(45) Date of Patent: Jul. 17, 2012

(54) EXPANDABLE JOINT

(75) Inventor: George N. Altounian, Johnson City, TN (US)

(73) Assignee: Oshkosh Corporation, Oshkosh, WI (US)

( * ) Notice: Subject to any disclaimer, the term of this patent is extended or adjusted under 35 U.S.C. 154(b) by 1092 days.

(21) Appl. No.: 12/094,395

(22) PCT Filed: Nov. 16, 2006

(86) PCT No.: PCT/US2006/044458
§ 371 (c)(1),
(2), (4) Date: May 20, 2008

(87) PCT Pub. No.: WO2007/061736
PCT Pub. Date: May 31, 2007

(65) Prior Publication Data
US 2008/0279035 A1  Nov. 13, 2008

Related U.S. Application Data

(60) Provisional application No. 60/738,525, filed on Nov. 21, 2005, provisional application No. 60/752,244, filed on Dec. 20, 2005.

(51) Int. Cl.
*B28C 5/20* (2006.01)
(52) U.S. Cl. .............................. 366/53; 366/1; 366/59

(58) Field of Classification Search ............... 366/1, 53, 366/59, 62; 428/317.5; 156/78
See application file for complete search history.

(56) References Cited

U.S. PATENT DOCUMENTS

| 3,641,730 A | * | 2/1972 | Meckstroth | 52/586.2 |
| 6,902,311 B1 | * | 6/2005 | Khouri et al. | 366/54 |
| 2003/0105177 A1 | | 6/2003 | Parfondry et al. | |
| 2004/0132848 A1 | * | 7/2004 | Whinnery et al. | 521/155 |
| 2007/0189110 A1 | * | 8/2007 | Khouri | 366/59 |

OTHER PUBLICATIONS

PCT International Search Report and Written Opinion, based on International Application No. PCT/US06/44458, date of mailing of the International Search Report Jun. 10, 2008 (6 pgs.).

* cited by examiner

*Primary Examiner* — Maria Veronica Ewald
*Assistant Examiner* — Robert J Grun
(74) *Attorney, Agent, or Firm* — Foley & Lardner LLP (57) ABSTRACT

A concrete mixing includes a barrel having an interior surface and an exterior surface. A blade extends from the interior surface for mixing concrete and a ring is positioned about the exterior surface of the barrel for rotation of the barrel. An expandable joint is provided under compression between the ring and the exterior surface of the barrel to accommodate different thermal coefficients of expansion between the barrel and the ring.

16 Claims, 10 Drawing Sheets

EXPANDABLE JOINT

CROSS REFERENCE TO RELATED APPLICATIONS

The present Application claims the benefit of priority, as available under 35 U.S.C. §119(e)(1), to U.S. Provisional Patent Application No. 60/738,525 titled "Expandable Joint" filed on Nov. 21, 2005 and U.S. Provisional Patent Application No. 60/752,244 titled "Expandable Joint" filed on Dec. 20, 2005 (which are incorporated by reference in their entirety).

BACKGROUND

Joining two or more structures to one another is sometimes difficult due to the different nature or different characteristics of the structures themselves. For example, materials may have different coefficients of thermal expansion. This may result in one structure expanding by a first degree and another structure expanding by a second greater degree, and the binding polymer expanding by a third degree. These different degrees of expansion may cause separation of the two structures or may weaken the joint between the structures. The technology also allows preferentially improving the strength of one interface versus the other, to eliminate stresses at the preferred interface. Furthermore, it would be desirable to provide an expandable joint that solves the difficulties associated with prior joints. It would also be desirable to provide an expandable joint in which the compression set of the expandable polymer is preferentially less than about 3.5% at 25% deflection, in order to enhance the ability of the material to act as a shock absorber to sustain and endure impact and fatigue loading of the expandable elastomeric joint.

DETAILED DESCRIPTION

Figure 1:
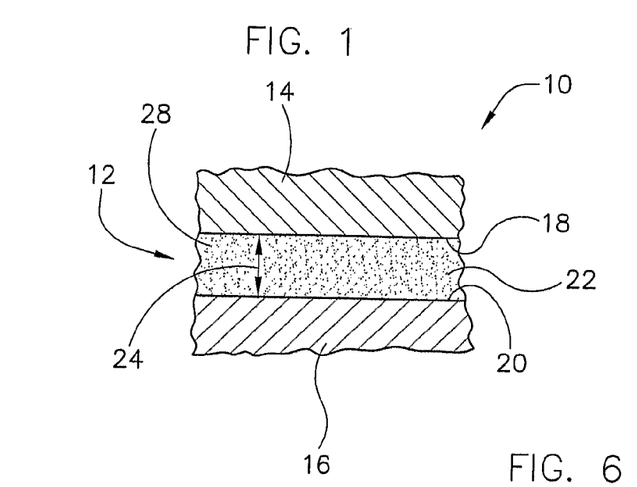
FIG. 1 is a fragmentary sectional view of a joint according to one exemplary embodiment.

FIG. 1 is an enlarged fragmentary sectional view of an apparatus 10 having a juncture or joint 12 between two structures 14, 16. Juncture or joint 12 secures structures 14 and 16 to one another during expansion and contraction of structures 14 and 16 relative to one another. Joint 12 generally includes interfaces 18, 20 and binder 22. Interfaces 18, comprise the surfaces of structures 14 and 16, respectively, which are contacted by binder 22 and which are either held relative to one another by binder 22 or which have spaces therebetween which are filled by binder 22. Although interfaces 18, 20 are illustrated as being generally flat, planar and smooth surfaces, interfaces 18, 20 may have multiple geometric shapes, textures and configurations. In one embodiment, one or both of interfaces 18, 20 may be configured such that at least a portion of interface 18 and/or interface 20 is continuously surrounded by binder 22. In another embodiment, one or both of interfaces 18, 20 may include a neck region and a head region such that the head region or either interface 18 or interface 20 is partially surrounded by binder 20 so as to be captured. Although interfaces 18 and 20 are illustrated as extending parallel and opposite to one another, interfaces 18, 20 may alternatively extend non-parallel or perpendicular to one another.

Binder 22 generally comprises a composition of one or more materials configured such that it may be injected between interfaces 18, 20 while in a fluid form or state. The composition of binder 22 is also configured such that binder 22 expands against and solidifies against interfaces 18, 20. In one embodiment, binder 22 is configured to expand beyond interfaces 18, 20 but be at least partially contained between interfaces 18, 20, resulting in binder 22 being compressed so as to exert an outward force as indicated by arrows 24 against interfaces 18, 20. The compression of binder 22 between interfaces 18, enables binder 22 to automatically adjust to or accommodate movement between interfaces 18, 20. For example, in one embodiment, interfaces 18, 20 may have different coefficients of thermal expansion, which may result in interfaces 18, 20 moving away from one another during temperature variations. In such a circumstance, binder 22, in its compressed state with a low compression set value, preferably lower than about 3.5% at 25% deflection, automatically expands to accommodate the movement and so as to maintain its contact with interfaces 18, 20. As a result, the integrity of the joint between binder 22 and interface 18 and binder 22 and interface 20 is maintained. In particular embodiments, the continuous positive pressure exerted by binder 22 upon interfaces 18, 20 also stabilizes and rigidifies apparatus 10 and its structures 14, 16.

According to one exemplary embodiment, binder 22 comprises a composition facilitating nucleation to enable binder 22 to expand into contact with interfaces 18, 20 and to be placed in compression, while reducing thermal shrinkage due to exotherm as it reduces the bulk density of the polyurethane. In one embodiment, upon being nucleated, binder 22 includes a multitude of closed cells 28 dispersed throughout binder 22 such that binder 22 is generally homogenous in nature. Although cells 28 facilitate expansion of binder 22 against interfaces 18, 20, the low free rise density and the high in mold density create an integral skin on each of the walls of the cells such that the walls of the cells or the skin about the cells is sufficiently structurally strong so as to reduce or eliminate the potential of the cells collapsing when solidifying or placed under compression. As a result, during solidification binder 22 has zero or greatly reduced contraction, enabling binder 22 to be solidified against interfaces 18, 20 while continuing to exert positive pressure against interfaces 18, 20. In one embodiment, cells structure 28 is the consequence of a minimum free rise density of about 0.45 g/cc and a maximum in mold density of about 1.0 g/cc of binder 22. In other embodiments, the structural integrity of cells 28 may vary depending upon the remaining composition of binder 22 given by the degree of crystallinity of the polymer and its catalysis.

According to one embodiment, binder 22 comprises a polymeric binder including cells 28. According to one embodiment, binder 22 comprises a thermo-set polymeric material including cells 28. According to one specific embodiment, binder 22 includes a nucleation agent such as a gas, air, carbon dioxide, Freon, methylene, chloride and the like.

Introduction of the nucleation agent into or the creation of the nucleation agent in the material or materials of binder 22 may be achieved in several fashions. In one embodiment, binder 22 includes a surfactant which upon agitation creates air nucleation into the final binder product.

According to another embodiment, in lieu of a surfactant being mixed with the remaining materials of binder 22, a thixotrophic/reinforcing agent is agitated or mixed with the remaining materials of binder 22. One example of a thixotrophic agent is mill fibers, very small ground fibers of a material such as glass having a length of approximately $\frac{1}{32}^{nd}$ of an inch. In still another embodiment, the nucleation agent or gas may be chemically derived from a reaction of the materials themselves. For example, the introduction of moisture or a known concentration of water ($H_2O$) during the formation of urethane in the presence of oxygen, such as air, results in the creation of carbon dioxide, which serves as the nucleation agent to create cells 28 within binder 22. In each of the aforementioned examples, one example of materials that may be used with the nucleation agent to form binder 22 includes polyisocyanate and a polyol. In other embodiments, other materials may be combined with a nucleation agent to form binder 22.

According to one example embodiment, interfaces 18, 20 are at room temperature (e.g. 75 to 85 degrees Fahrenheit as binder 22 is injected between interfaces 18, 20 at a pressure of between about 50 and 60 pounds per square inch (psi). It has been found that injection of the binder between interfaces 18, 20 while such surfaces are at this temperature increases the "gel out" time of the binder, such as polyurethane, to enhance the surface wet-out and hence improve interface adhesion of the binder to interfaces 18, 20.

According to another embodiment, interface 18 or interface 20 is heated to a temperature within a range of between about 110 and 130 degrees Fahrenheit while binder 22 is injected between interfaces 18 and 20 at a higher pressure to compensate for the shorter cure time resulting from the heat from interfaces 18 and/or 20. In one embodiment, binder 22 is injected at a pressure within a range of between about 60 and 80 psi. Because the shorter cure time or gel-out time is compensated by the faster distribution of binder 22 against interfaces 18, 20, surface wet-out and adhesion between binder 22 and interfaces 18, 20, is maintained or enhanced. At the same time, because one of interfaces 18, 20 is heated and subsequently allowed to cool, the cavity between the interfaces 18 and 20 is increased during the casting process of the micro-cellular elastomer. As the interfaces cool down during the reaction process, the polymer will be maintained in compression mode, hence improving contraction to better connect to the other of interface 18, 20. For example, in one embodiment, structure 14 may comprise a drum while structure 16 comprises a ring about the drum. In such an embodiment, structure 16 is heated and subsequently cooled such that the ring of structure 16 contracts about the drum of structure 14.

In particular embodiments, interface 18 or interface 20 may additionally be cleaned, roughened or coated with a coupling agent to enhance adhesion. In some embodiments, a primer (coupling agent) may also be applied to interface 18 or interface 20 to enhance adhesion. For example, in one embodiment, an Autocoat CIP epoxy primer LV, light gray from Akzo may be applied to one or both of the interfaces 18, 20 to enhance adhesion with binder 22 which may comprise a polytetramethylene ether glycol based MDI polyurethane. In one embodiment, the primer is applied in a 2:1 primer: hardener ratio by weight. In other embodiments, such a primer may be omitted from between binder 22 and one or both of interfaces 18, 20. In another embodiment, a 100% solids coupling agent such as the polysulfide epoxy surface coating from PolySpec a "Thiokol" product is used to enhance adhesion. Solvent based coupling agents may trap a certain concentration of high vapor pressure, high flash point solvents that may attack the micro-cellular polymer interface due to the high exotherm, and weaken the bond interface. Precautions should be taken to eliminate any trapped solvents in the coupling agent "primer". According to a preferred embodiment, a 100% solids coupling agent is used to maintain consistent integrity of the bond strength of the interface. By way of example, the Applicant believes that a Thiokol 2233 (100% solids) agent provides more consistent bond strength values and reduced failure rates (e.g. on the order of less than about 2%, when compared with failure rates of more than about 5% with the CIP primer).

Overall, binder 22 securely retains interfaces 18, 20 of structures 14, 16, respectively, relative to one another. Because binder 22 is injected in a fluid state between interfaces 18, 20, binder 22 is more likely to fill in irregular shaped areas between interfaces 18, 20 and to fill voids between interfaces 18, 20, resulting in a greater surface area of interfaces 18 and 20 being contacted by binder 22. Because binder 22 experiences little or no contraction during its curing or other solidification, binder 22 remains in contact with interfaces 18 and 20 when solidified. As a result, the large surface area contact between binder 22 and interfaces 18 and 20 is maintained and the formation of voids between interfaces 18 and 20, which may weaken junction 12, are minimized or eliminated. Because binder 22, in one embodiment, is in a state of compression upon the completion of curing or solidification so as to continue to exert a positive pressure against interfaces 18, 20, binder 22 automatically expands when necessary to accommodate shifting of interfaces 18, 20 or structures 14 and 16 relative to one another due to such factors as interfaces 18, 20 having different coefficients of thermal expansion. As a result, during such shifting, binder 22 substantially maintains its surface area of contact with interfaces 18, 20 without separating from interfaces 18, 20.

Figure 2:
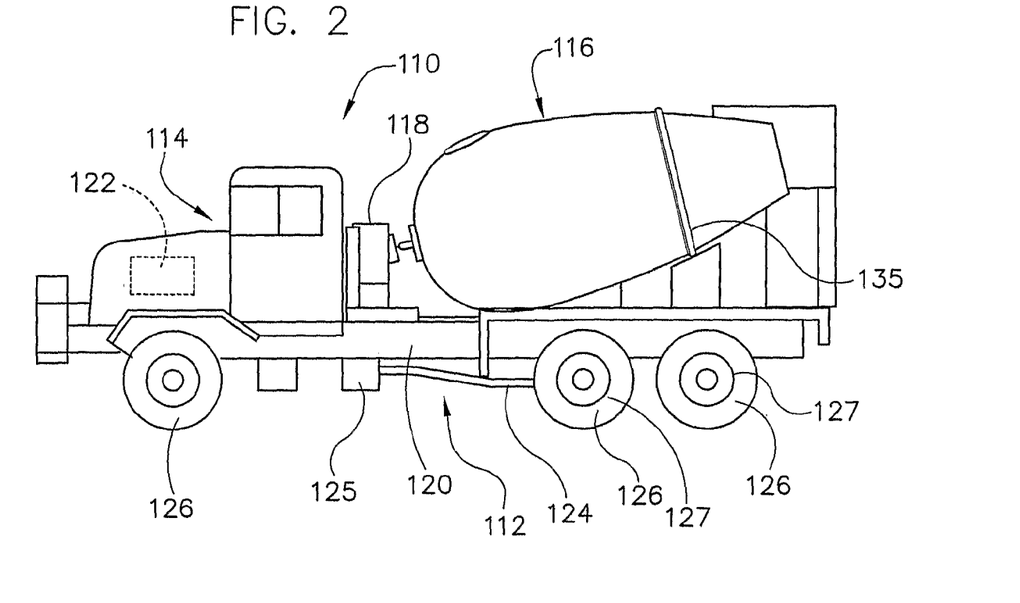
FIG. 2 is a side elevational view of one example of a concrete mixing vehicle having a roller ring and a drum barrel forming one example of the joint of FIG. 1.
Figure 3:
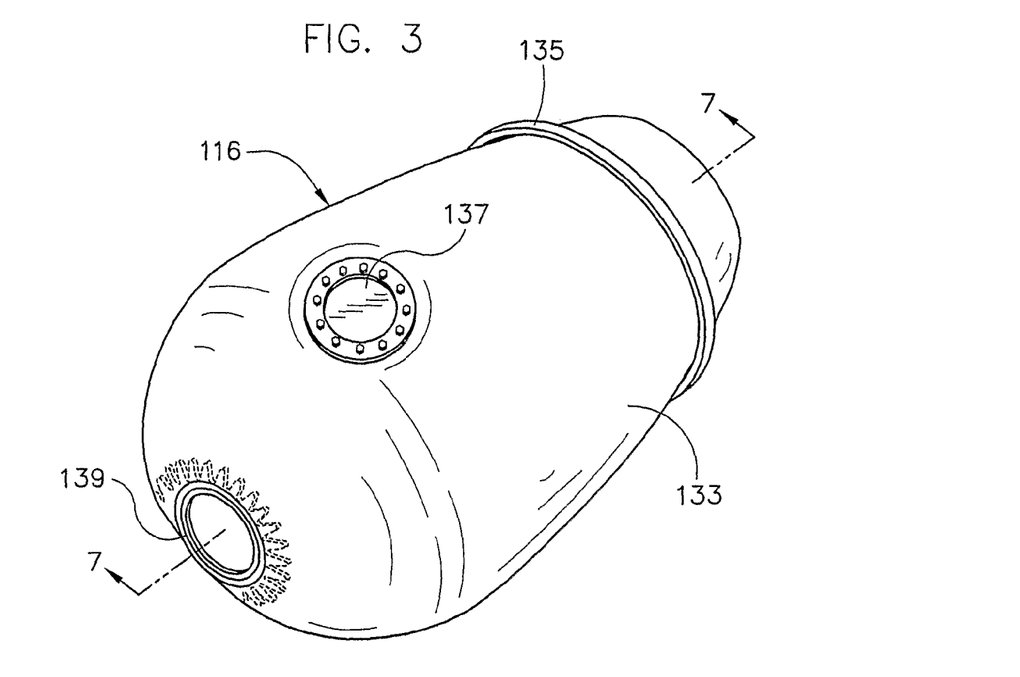
FIG. 3 is a perspective view of the drum of FIG. 2.

FIGS. 2 and 3 illustrate one example of an application of the joint arrangement shown in FIG. 1. In particular, FIGS. 2 and 3 illustrate the use of joint arrangement 12 of FIG. 1 with a concrete vehicle or mixing truck 110 (shown in FIG. 2). Concrete mixing truck 110 includes a chassis 112, a cab region 114, a mixing drum 116, and a mixing drum drivetrain 118. Chassis 112 includes a frame 120, a power source 122, a drivetrain 124, and wheels 126. Frame 120 provides a mixing truck 110 with the structural support and rigidity needed to carry heavy loads of concrete. Power source 122 is coupled to frame 120 and generally comprises a source of rotational mechanical energy which is derived from a stored energy source. Examples include, but are not limited to, an internal combustion gas-powered engine, a diesel engine, turbines, fuel cell driven motors, an electric motor or any other type of motor capable of providing mechanical energy.

Drivetrain 124 is coupled between power source 122 and wheels 126 and transfers power (or movement) from power source 122 to wheels 126 to propel truck 110 in a forward or rearward direction. Drivetrain 124 includes a transmission 125 and a wheel end reduction unit 127. Both transmission 125 and wheel end reduction unit 127 utilize a series or set of gears to adjust the torque transmitted by power source 122 to wheels 126. One example of a wheel end reduction unit is described in U.S. Pat. No. 6,764,085, issued on Jul. 20, 2004, entitled NON-CONTACT SPRING GUIDE, the full disclosure of which is hereby incorporated by reference.

Cab region 114 is coupled to chassis 112 and includes an enclosed area from which an operator of truck 110 drives and controls at least some of the various functions of truck 110.

Drive assembly or drivetrain 118 is operatively coupled to power source 122 and mixing drum 116 and uses the power or movement from power source 122 to provide a rotational force or torque to mixing drum 116. According to an alternative embodiment, the drivetrain may be powered by a source other than power source 122 that is provided on truck 110.

Figure 4:
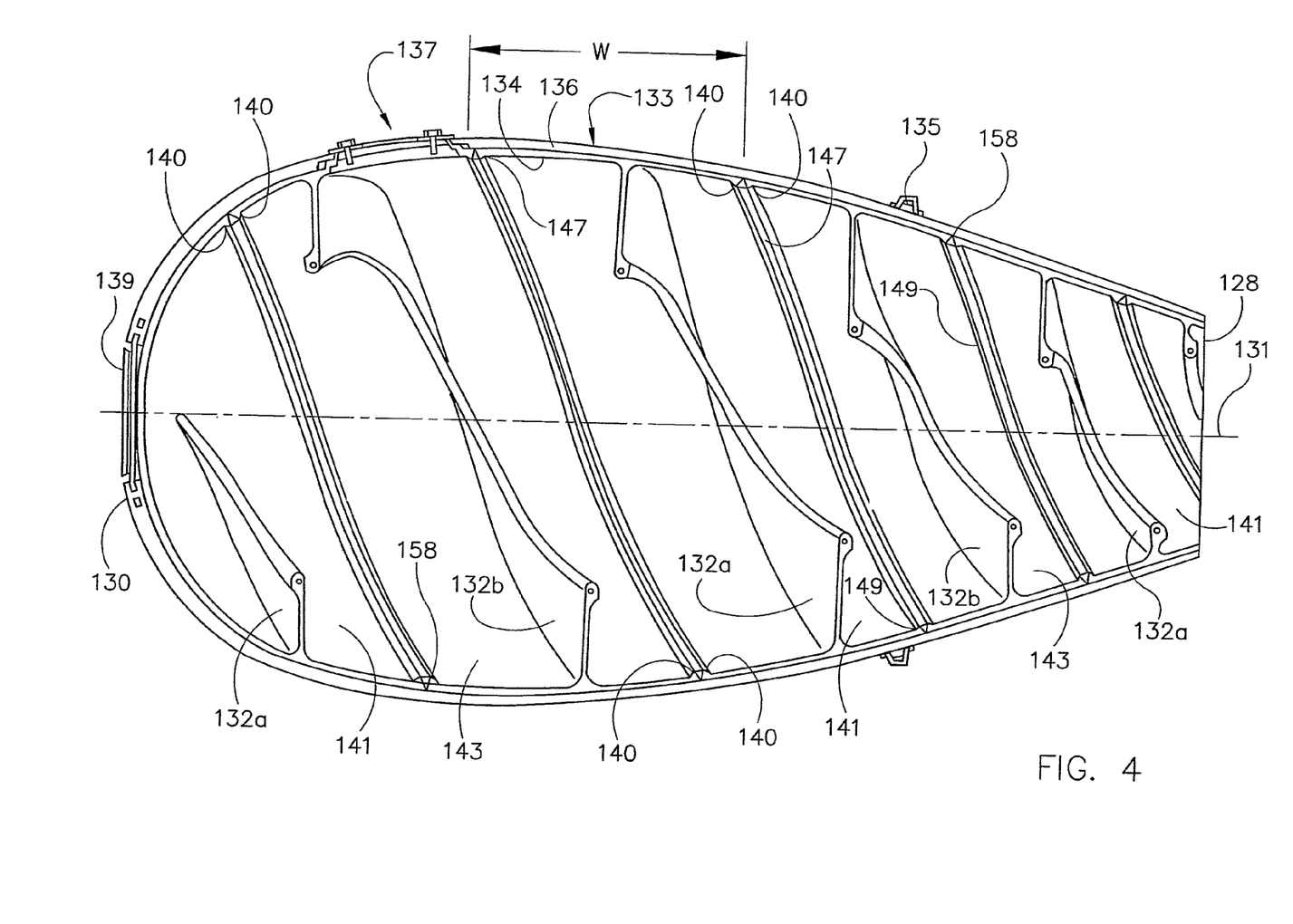
FIG. 4 is a sectional view of the drum of FIG. 3.

Referring now to FIGS. 3 and 4, mixing drum 116 includes a barrel 133, projections 132, ramps 140, a hatch over assembly 137 or 300, a drive ring 139, and a roller ring 135. Barrel 133 is a generally teardrop- or pear-shaped container that has an opening 128 on one end (the smaller end) and a drive ring 139 (described below) coupled to the other larger end 130 or barrel 133. Barrel 133 includes an inner drum layer 134 and an outer drum layer 136. Inner drum layer 134 is made up of two spiral-shaped sections 141 and 143 that are "screwed" or mated together. Each of sections 141 and 143 is a substantially flat panel that is formed in the shape of a spiral around an axis that becomes a central axis 131 of barrel 133 when sections 141 and 143 are completely assembled. Each of sections 141 and 143 has a width W that extends substantially parallel to axis 131 of barrel 133 (or that extends generally along the length of central axis) and a length that substantially circumscribes or encircles the axis 131. According to one exemplary embodiment, the width of each section varies along the length of each section, for example from between approximately 6 inches and 36 inches. Each of the sections 141 and 143 has a first edge 147 that extends the length of the section and a second edge 149 that extends the length of the section. Each of sections 141 and 143 is spiraled around the axis 131 of barrel 133 such that there is a gap between the first edge 147 of the section and the second edge 149 of the same section. This gap provides the space that will be filled by the other section when it is mated or screwed to the first section. Accordingly, when the sections 141 and 143 are assembled together to form inner drum layer 134, edge 147 of section 141 will abut edge 149 of section 143 and edge 149 of section 141 will abut edge 147 of section 143. A seam 158 is formed where the edges of sections 141 and 143 abut one another.

Once the two sections of the inner drum layer 134 have been assembled, outer drum layer 136 is formed as a continuous layer around the outer surface of the inner drum layer 134. Accordingly, outer drum layer 134 extends continuously from one end of the barrel to the other and spans the seams between sections 141 and 143. Outer drum layer 136 is a structural layer that is made from a fiber reinforced composite material applied by winding resin coated fibers around the outer surface of inner drum layer 134. According to one embodiment, the resin is Hetron 942, or Hetron 6505-O57A available from Ashland Chemical, in Dublin, Ohio, and the fibers are fiberglass, preferably 2400 Tex E Glass (approximately 206 yards/lb). According to one embodiment, the angle at which the fibers are wound around the drum at the major axis (the location at which barrel 133 has the greatest diameter) is approximately 10.5 degrees relative to axis 131 of the barrel 133. During the winding process, the resin coated fibers are wrapped generally from one end of the drum to the other. According to one embodiment, the fibers are provided in a ribbon or bundle that is approximately 250 millimeter wide and includes 64 strands. The ribbon of fibers is wrapped around the drum such that there is approximately 50% overlap between each pass of the ribbon. The wrapping of the fibers from end to end, helps to provide drum 116 with the structural support to withstand the various forces that are applied to drum 116 in a variety of different directions.

According to an exemplary embodiment, projections 132 and ramps 140 are integrally formed as a single unitary body with sections 141 and 143. Each of sections 141 and 143, and the corresponding projections and ramps, are formed through an injection molding process from polyurethane impregnated with a slip agent, and outer drum layer 136 is made using fiberglass fibers coated with a resin. According to other alternative embodiments, the inner drum layer and/or the outer drum layer may be made from any one or more of a variety of different materials including but not limited to polymers, elastomers, rubbers, ceramics, metals, composites, etc. According to still other alternative embodiments, other processes or components may be used to construct the drum. For example, according to various alternative embodiments, the inner drum layer may be formed as a single unitary body, or from any number of separate pieces, components, or sections. According to other alternative embodiments, the inner drum layer, or any of sections making up part of the inner drum layer, may be made using other methods or techniques. According to still other alternative embodiments, the outer drum layer may be applied over the inner drum layer using any one or more of a number of different methods or techniques.

Referring still to FIG. 4, projections 132a and 132b are coupled to sections 141 and 143, respectively, and extend inwardly toward central axis 131 of barrel 133 and along the length of the respective section. Accordingly, two substantially identical projections 132a and 132b are coupled to inner drum layer 134 and spiral around the inner surface of inner drum layer 134 in the shape of an archimedian spiral. In one embodiment, projection 132a and 132b extend from an axial end of barrel 133 across an axial midpoint of barrel 133. Projections 132a and 132b are circumferentially spaced apart around axis 131 by approximately 180 degrees. Because projections 132a and 132b are substantially identical, further references to the projections will simply refer to "projection 132" when discussing either (or both of) projection 132a and 132b.

Figure 5:
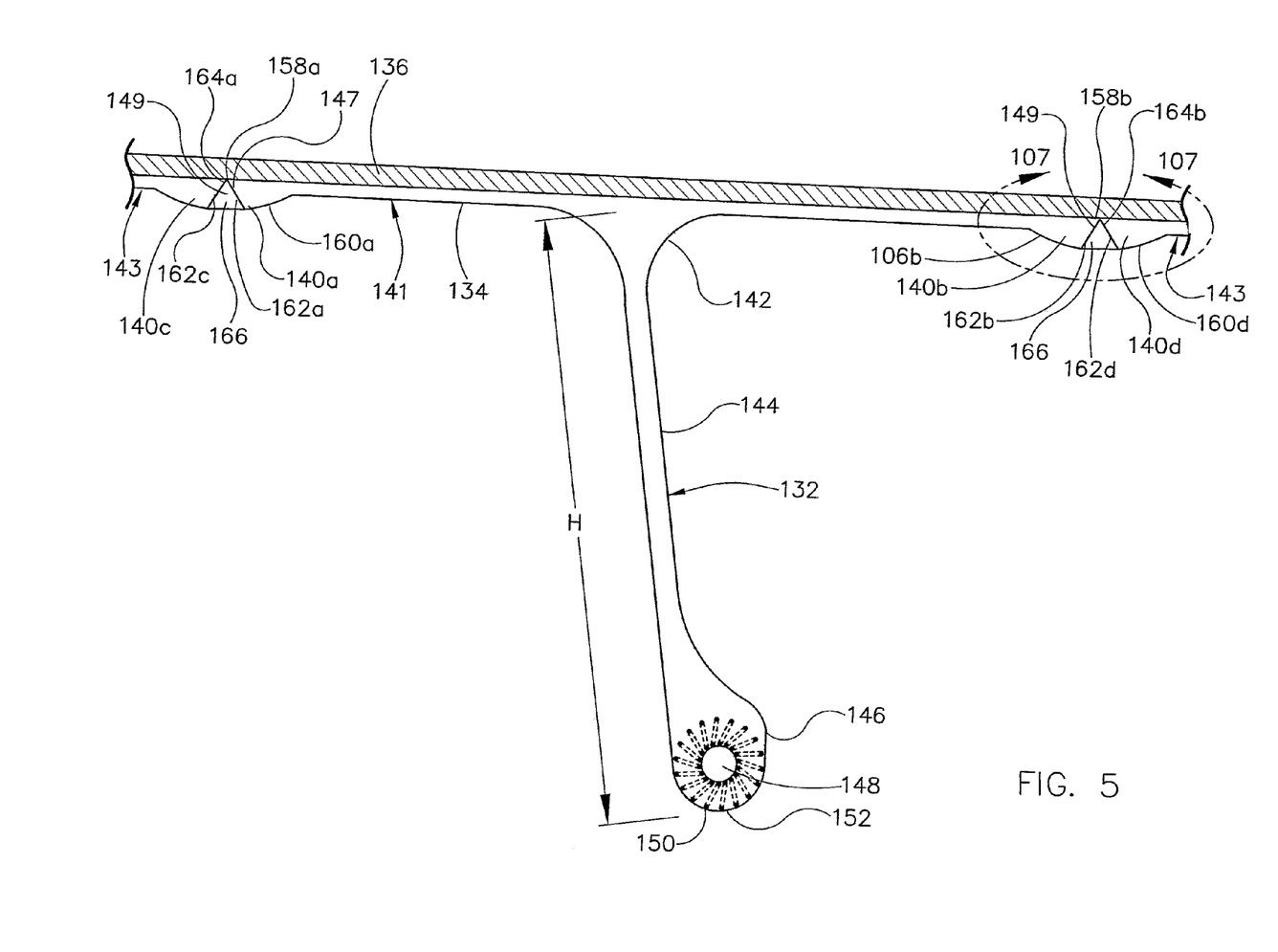
FIG. 5 is an enlarged fragmentary sectional view of a portion of the drum of FIG. 4.

A projection and one or more ramps are coupled to each section of inner drum layer 134. Because the projection and ramp(s) that are coupled to each section include substantially identical features and elements, where appropriate, the projection and ramps that are coupled to one section will be described, it being understood that the projection and ramps of the other section are substantially identical. FIG. 5 illustrates projection 132 and ramps 140a and 140b, which are coupled to section 141, in greater detail.

Projection 132 (e.g., fin, blade, vane, screw, formation, etc.) includes a base portion 142, an intermediate portion 144, and end portion 146. Base portion 142 extends inwardly from section 141 toward the axis of drum 116 and serves as a transitional area between section 141 and intermediate portion 144 of projection 132. Such a transitional area is beneficial in that it tends to reduce stress concentrations in base portion 142 that may result from the application of force to projections 132 by the concrete. The reduction of the stress concentrations tends to reduce the likelihood that projection 132 will fail due to fatigue. To provide the transitional area, base portion 142 is radiused or tapered on each side of projection 132 to provide a gradual transition from section 141 to intermediate portion 144. To minimize any unwanted accumulation of set concrete, the radius is preferably greater than 10 millimeters. According to one exemplary embodiment, the radius is approximately 50 millimeters. According to another embodiment, the radius begins on each side of projection 132 proximate section 141 approximately three inches from the centerline of projection 132 and ends approximately five inches up the height H of projection 132, proximate intermediate region 144 of projection 132. Because drum 116 rotates, the orientation of any particular section of projection 132 constantly changes. Accordingly, to simplify the description of projection 132, the term "height," when used in reference to projection 132, will refer to the distance projection 132 extends inwardly toward the center axis of drum 116, measured from the center of base portion proximate section 141 to the tip of end portion 146. It should be noted, however, that the height of projection 132 changes along the length of projection 132. Consequently, the locations at which the radius or taper begins and/or ends, or the distance over which the radius or taper extends, may vary depending on the height and/or location of any particular portion of the projection. According to various alternative embodiments, the radius of the base region may be constant or it may vary. According to other alternative embodiments, the transition between the section and the intermediate portion of the projection may be beveled or may take the form of some other gradual transition. Moreover, the locations at which the transition or taper may begin or end may vary depending on the material used, the thickness of the inner drum wall, the height of the projection, the loads that will be placed on the projection, the location of a particular portion of the projection within the drum, and a variety of other factors.

According to any exemplary embodiment, the characteristics of the taper should be such that the projection is allowed to at least partially flex under the loads applied by the concrete. However, if the taper is such that it allows the projection to flex too much, the projection may quickly fatigue. One the other hand, if the taper is such that it does not allow the projection to flex enough, the force of the concrete on the projection may pry on inner drum layer 134 and potentially tear inner drum layer away from outer drum layer 136.

Intermediate portion 144 of projection 132 extends between base portion 142 and end portion 146. According to one embodiment, intermediate portion 144 has a thickness of approximately six millimeters and is designed to flex when force from the concrete is applied thereto.

End portion 146 of projection 132 extends from intermediate portion 144 toward the axis of drum 116 and includes a support member 148 and spacers 150. The thickness of end portion 146 is generally greater than the thickness of intermediate portion 144. Depending on where along the length of projection 132 a particular section of end portion 146 is provided, the added thickness of end portion 146 may be centered over intermediate portion 144 to offset to one side or the other. In some areas along the length of projection 132, end portion 146 is provided on only one side of intermediate portion 144 (e.g., the side closest to opening 128 or the side closest to end 130). In such a configuration, end portion 146 acts as a lip or flange that extends over one side of intermediate portion 144 and serves to improve the ability of projection 132 to move or mix concrete that comes into contact with the side of intermediate portion 144 over which end portion 146 extends. Due to the increased thickness of end portion 146 in relation to intermediate portion 144, end portion 146 includes a transitional region 145 that provides a gradual transition from intermediate portion 144 to end portion 146. According to an exemplary embodiment, the transitional region is radiused. According to alternative embodiments, the transitional region may be beveled or tapered. To minimize any wear or accumulation that may occur as a result of concrete passing over end portion 146, projection 132 terminates in a rounded edge 152.

According to various alternative embodiments, each of the base region, the intermediate region, and the end region may be different sizes, shapes, thicknesses, lengths, etc. depending on the particular situation or circumstances in which the drum will be used.

FIG. 5 illustrates support member 148 in greater detail. As shown in FIG. 5 support member or torsion bar 148 is an elongated circular rod or beam that is embedded within end portion 146 of projection 132 to provide structural support to projection 132. Torsion bar 148 has a shape that corresponds to the spiral-like shape of projection 132 and extends the entire length of projection 132. The ends of bar 148 have flared fibers that are embedded in inner drum layer 134. Torsion bar 148 serves to substantially restrict the ability of end portion 146 of projection 132 to flex when a load is applied to projection 132 by the concrete, and thereby prevents projection 132 from essentially being folded or bent over by the concrete. Although sufficiently rigid to support projection 132, torsion bar 148 is preferably torsionally flexible. The torsional flexibility of torsion bar 148 allows it to withstand torsional loads that result from some deflection of end portion 146 of projection 132. According to one exemplary embodiment, support member 148 is a composite material that is made primarily of carbon or graphite fibers and a urethane-based resin. According to one exemplary embodiment, the ratio of carbon fibers to the urethane-base resin is 11 pounds of carbon fiber to 9 pounds of urethane-based resin. One example of such a urethane-based resin is Erapol EXP 02-320, available from Era Polymers Pty Ltd in Australia, or Elastocast 72006R (polyol component) and Elastocast 55090T (isocyanate component) available from BASF in the U.S. According to alternative embodiments, the support member may be made from any combination of materials that allows the support member to provide the desired structural support yet at the same time allows the torsion bar to withstand the torsional loads that may be applied to the torsion bar. For example, the torsion bar may be made from one or more fiberglass fibers and ester-based resins. According to other alternative embodiments, the size and shape of the support member may vary depending on the particular circumstances in which the support member will be used.

According to an exemplary embodiment, support member 148 is made through a pulltrusion process. The pulltrusion process includes the steps of collecting a bundle of fibers, passing the fibers through a bath of resin or injected into a die, and the pulling the resin coated fibers through a tube. The support member 148 is then wrapped around an appropriately shaped mandrel and allowed to cure to give support member 148 the desired shape. The fibers are pulled through the tube by a cable of a winch that is passed through the tube and coupled to the fibers. To facilitate the coupling of the cable to the fibers, the fibers are doubled over and the cable is attached to the loop crated by the doubled over fibers. The winch pulls the cable back through the tube, which, in turn, pulls the fibers through the tube. According to one exemplary embodiment, the urethane-based resin through which the fibers are passed before entering the tube is injected into the tube at various points along the length of the tube as the fibers are being pulled through the tube. According to alternative embodiments, the support member may be made by any one or more of a variety of different processes.

According to one exemplary embodiment, projection 132 and ramps 140 are integrally formed with each of sections 141 and 143 as a single unitary body and are made along with sections 141 and 143. As described above, each of sections 141 and 143, and the corresponding projection 132 and ramps 140, are preferably made through an injection molding process during which an elastomer is injected between molds. In order to embed support member 148 within end portion 146 of projection 132, support member 148 is placed in a mold that defines the shape of projection 32 prior to the injection of the elastomer. To keep support member 148 in the proper location within the mold during the injection process, spacers, shown as helical springs 150, are wrapped around the circumference of support member 148 and spaced intermittently along the length of support member 148. Each spring 150 is retained around the circumference of support member 148 by connecting one end of spring 150 to the other. When support member 148 and springs 150 are placed in the mold prior to the injection process, springs 150 contact an inside surface of mold 154 and thereby retain support member 148 in the proper location within the mold.

When the elastomer is injected into the molds, the elastomer flows through spring 150 and surrounds (e.g., embodies, encapsulates, etc.) each of its coils. As a result, there is a continuous flow of the elastomer through spring 150, such that if the elastomer does not securely bond to the coils of spring 150, the areas along projection 132 where springs 150 are placed are not significantly weaker than the areas along projection 132 where there are no spring spacers 150. According to various alternative embodiments, other materials and structures may be used as spacers. For example, the spacer may be made from any one or more of a variety of materials including polymers, elastomers, metals, ceramics, wood, etc. The spacer may also be any one of a variety of different shapes and configurations, including but not limited to, circular, rectangular, triangular, or any other shape. Moreover, the spacer may not substantially surround the support member, but rather may include one or more members that are provided intermittently around the periphery of the support member. According to other alternative embodiments, the spacer may be a flat disc or a cylinder having an outside diameter that contacts the inside surface of the mold and an aperture through which the support member passes. The flat disc or cylinder also may include a plurality of apertures extending therethrough to allow for the continuous flow of the injected elastomer through at least some areas of the disc.

Hatch cover assembly 137 comprises an arrangement of one or more structures configured to releasably close or cover a hatch opening through barrel 133. In one embodiment, hatch cover assembly 137 may comprise a hatch cover assembly similar to that shown in International Patent Application Serial No. PCT/US 2003/025654 entitled MIXING DRUM HATCH, filed on Aug. 15, 2003, by Anthony Khouri, William Rogers and Peter Saad, wherein the entire disclosure of such application is hereby incorporated by reference. In other embodiments, hatch cover assembly 137 may have other configurations. In some embodiments, hatch cover assembly 37 may be omitted where barrel 133 omits a hatch.

Drive ring 139 (also known as a sprocket, spider, daisy, etc.) is located at an end of barrel 133 and is configured to operably couple drum 116 to drivetrain 118. Roller ring 36 is configured to serve as a surface against which rollers 64 coupled to frame 20 ride as drum 116 rotates. Examples of potential constructions for drive ring 139 are found in International Patent Application Serial No. PCT/US03/25656 entitled Mixing Drum and filed on Aug. 15, 2003 by Anthony Khouri, William Rogers and Peter Saad, wherein the entire disclosure of this application is hereby incorporated by reference. Additional examples of drive ring 139 are found in co-pending U.S. patent application Ser. No. 11/275,290 and filed on Dec. 21, 2005 by George Altounian, and entitled Curable Polyester Resin Compositions wherein the entire disclosure of such application is hereby incorporated by reference.

Roller ring 135 generally comprises a circular or annular member that fits around the exterior barrel 133 between the ends of barrel 133. Roller ring 135 is configured to serve as a surface against which rollers or other bearing members ride as drum 116 rotates. Roller ring 135 is secured to barrel 133 by binder 22 as described above with respect to FIG. 1.

Figure 6:
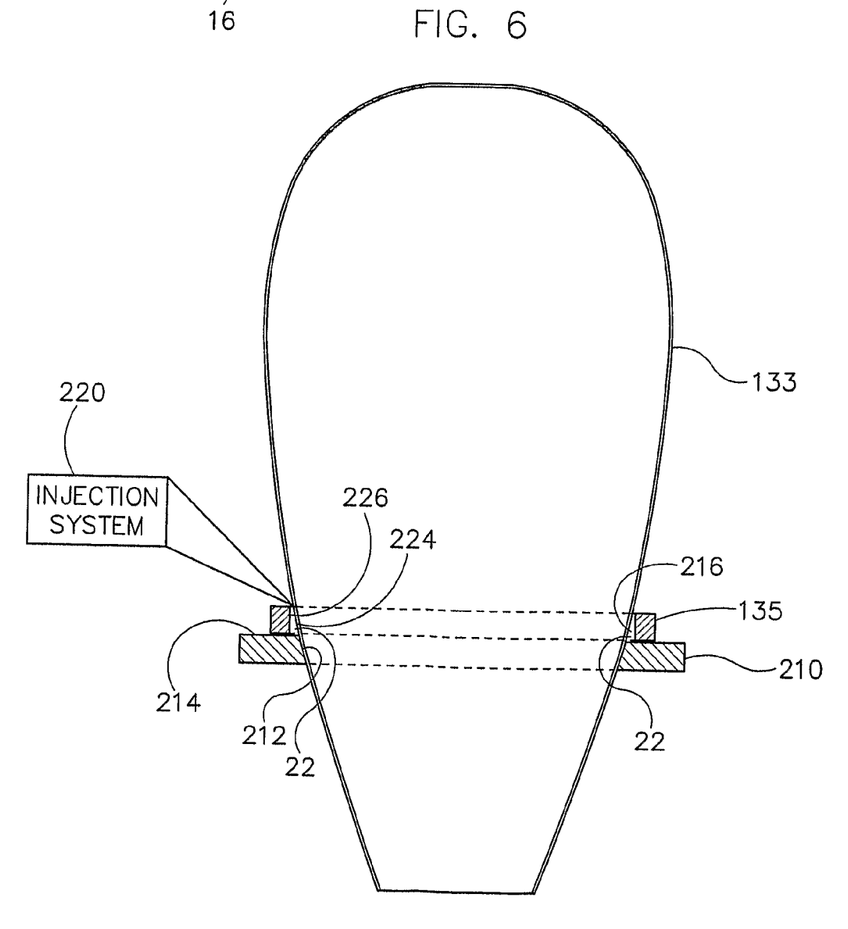
FIG. 6 is a side elevational view with portions shown in section schematically illustrating the formation of the joint of FIG. 1 to join the barrel and the roller ring.

FIG. 6 illustrates securement of roller ring 135 to barrel 133. In the example shown in FIG. 6, roller ring 135 is placed upon a barrel support 210. Barrel support 210 comprises one or more structures configured to engage and support barrel 133 in a predefined position relative to roller ring 135 as binder 22 is injected between roller ring 135 and barrel 133. In the particular illustrated embodiment, barrel support 210 also supports roller ring 135. In one embodiment, barrel support 210 comprises an annular support member having an inner circumferential surface 212 having a diameter so as to engage barrel 133 and an axial surface 214 upon which roller ring 135 may rest. In one particular embodiment, barrel support 210 comprises a compressible ring. In one particular embodiment, barrel support 210 comprises an inflated ring through which barrel 133 is partially positioned and upon roller ring 135 is supported.

Barrel support 210 supports roller ring 135 at a location relative to barrel 133 such that a gap 216 is formed between barrel 133 and roller ring 135. As shown by FIG. 6, an injection system 220 is provided to inject binder 22 (shown in FIG. 1) into gap 216. Injection system 220 facilitates the nucleation of binder 22 such that binder 22 expands within gap 216 into contact with the exterior surfaces 224 of barrel 133 and surfaces 226 of roller ring 135 which partially to form gap 216 and which serve as interfaces between drum 133 and roller ring 135. Injection system 220 continues to inject binder 22 within gap 216 such that binder 22 is placed in compression between surface 224 and 226.

As discussed above with respect to FIG. 1, binder 22 is configured such that binder 22 solidifies while remaining in contact with surfaces 224 and 226 to provide a reliable joint between barrel 133 and roller ring 135 to maintain roller ring 135 secured to barrel 133 despite potential different coefficients of thermal expansion between barrel 133 and roller ring 135. As discussed above, and in the particular example shown, barrel 133 is substantially formed from non-metallic materials. In the particular example shown, roller ring 135 is formed from one or more metallic materials or alloys thereof. The non-metallic construction of barrel 133 enables barrel 133 to be more economically manufactured, to be lighter weight and to be more easily cleaned. At the same time, the metallic construction of roller ring 135 provides roller ring 135 with additional strength for supporting barrel 133. The non-metallic nature of barrel 133 and the metallic nature of roller ring 135 results in barrel 133 and roller ring 135 having distinct coefficients of thermal expansion. Despite this difference, binder 22 maintains roller ring 135 in secure engagement with barrel 133 during temperature fluctuations. Binder 22 also maintains roller ring 135 in secure engagement with barrel 133 during uneven loading against roller ring 135.

In the particular embodiment illustrated, barrel 133 is substantially formed from one or more layers of polyurethane overlaid with one or more layers of fiberglass. Roller ring 135 is formed from aluminum. In other embodiments, barrel 133 may be formed from other non-metallic or metallic materials. Roller ring 135 may also be formed from other metallic or non-metallic materials.

Injection system 220 may have various configurations depending upon binder 22. In one embodiment in which binder 22 includes micro fibers, injection system 220 may be configured to agitate the micro fibers dispersed within binder 22 such that gas or air is introduced into binder 22 to nucleate binder 22. In another embodiment, injection system 220 may be configured to inject gas into binder 22 to facilitate nucleation of binder 22. In still another embodiment, injection system 220 may be configured to inject or add moisture or water to binder 22 prior to binder 22 being solidified to bring about nucleation of binder 22.

In the particular embodiment illustrated, binder 22 is injected within gap 216 continuously about the axis of barrel 133. In other embodiments, binder 22 may alternatively be intermittently injected at locations about the axis of barrel 133. Once binder 22 has solidified within gap 216, barrel support 210 is removed from barrel 133. In other embodiments, roller ring 135 may be secured and supported relative to barrel 133 during injection of binder 22 by other means.

According to one embodiment, prior to injection of binder 22, a seal is formed between ring 135 and barrel 133 so as to form a closed mold or cavity therebetween. In one embodiment, a silicone seal is applied between ring 135 and barrel 133 to form the closed mold. Gaps within the seal having closely controlled dimensions are provided to serve as vents to control pressure within the "mold" during injection of binder 22. In one embodiment, the vents are dimensioned such that there is a back pressure within the mold during injection of between about 7 and 10 psi. This back pressure results in the injected binder (polytetramethylene ether glycol (PTMEG) based MDI polyurethane in one embodiment) having an in-mold density less than its free-rise density. As a result, the process is well suited for a "water blown system" using water to form carbon dioxide as the nucleation agent while providing binder 22 with strength, closed cells and integral skins along each of the cells. As compared to other nucleation agents such as Freon, carbon dioxide from water is less volatile and less difficult to handle. In one embodiment, binder 22 has a free-rise density of between about 0.48 and 0.60 while having an in-mold density of 0.9.

The following Table 1 provides one example of a process for forming binder 22 with a compression set of 2.68%. In other embodiments, binder 22 may have other formulations and may be formed in other manners.

TABLE 1

Polyether Polyol (PTMEG based polyol) Charges for Expandable Roller Track Material

| Item | Polyol Raw Material | % |
|---|---|---|
| 1 | BASF 95A Unpromoted | 99.500% |
|   | 10% Niax A1 tertiary |  |
| 2 | acmine catalyst | 0.015% |

TABLE 1-continued

Polyether Polyol (PTMEG based polyol) Charges for Expandable Roller Track Material

| | | |
|---|---|---|
| 3 | 10% UL-29 tin catalyst | 0.018% |
| 4 | L-5309 surfactant | 0.290% |
| 5 | Distilled Water | 0.180% |
| | | 100.00% |
| | Isocyanate based MDI/PTMEG Prepolymer | 18% NCO |
| | Weight Ratio of ISO/OH | 133/100 |

Urethane QC Data

| | Target | Minimum | Maximum |
|---|---|---|---|
| *Cream Time | 1 min | 40 sec. | 1 min. 20 sec. |
| *Gel Time | 2 min. 30 sec. | 2 min. | 3 min. |
| *Tack Free Time | 4 min. | 3 min. 30 sec. | 4 min. 30 sec. |
| *Free Rise Time | 5 min. | 4 min. | 6 min. |
| *Free Rise Density | 0.52 | 0.48 | 0.56 |
| *10 min. Shore A Hardness | 22.5 | 15 | 30 |
| *20 min. Shore A Hardness | 37.5 | 30 | 45 |
| ISO temperature | 138 F. | | |
| POLYOL temperature | 108 F. | | |
| Ring Temperature (135) | 80 F. | | |
| Drum Temperature (133) | 80 F. | | |
| Machine flow rate | 434 grams/sec. | | |
| Mechanical Properties | | | |
| Compressive Strength | 1200 psi | | |
| Compressive Modulus | 3.86 ksi | | |
| Tensile Strength | 1709 psi | | |
| Tensile Modulus | 3.33 ksi | | |
| Elongation at break | 372% | | |
| Fatigue (Endurance Testing) | 3 MM cycles | | |

Table 2 provides an example of a process for forming binder 22 with reinforced milled fiber and a compression set of 3.57%.

TABLE 2

Polyether Polyol (PTMEG based polyol with milled fiber) Charges for Expandable Roller Track Material

| Item | Polyol Raw Material | % |
|---|---|---|
| 1 | BASF 95A Unpromoted 10% Niax A1 tertiary | 70.947% |
| 2 | acmine catalyst | 0.013% |
| 3 | 10% UL-29 tin catalyst | 0.015% |
| 4 | L-5309 surfactant | 0.280% |
| 5 | 9007D Mille fiber | 9.540% |
| 6 | 6608 Milled fiber | 18.580% |
| 7 | BYK-410 air release agent | 0.500% |
| 8 | Distilled Water | 0.150% |
| | | 100.03% |
| | Isocyanate based MDI/PTMEG Prepolymer | 18% NCO |
| | Weight Ratio of ISO/OH | 92.4/100 |

Urethane QC Data

| | Target | Minimum | Maximum |
|---|---|---|---|
| *Cream Time | 32 sec. | 30 sec. | 50 sec. |
| *Gel Time | 79 sec. | 70 sec. | 90 sec. |
| *Tack Free Time | 102 sec. | 90 sec. | 120 sec. |
| *Free Rise Time | 146 sec. | 120 sec. | 165 sec. |

TABLE 2-continued

Polyether Polyol (PTMEG based polyol with milled fiber) Charges for Expandable Roller Track Material

| | | | | |
|---|---|---|---|---|
| *Free Rise Density | | 0.51 | 0.48 | 0.56 |
| *10 min. Shore A Hardness | | 30 | 20 | 40 |
| *20 min. Shore A Hardness | | 45 | 35 | 55 |
| ISO temperature | 110 F. | | | |
| POLYOL temperature | 110 F. | | | |
| Ring Temperature (135) | 80 F. | | | |
| Drum Temperature (133) | 80 F. | | | |
| Machine flow rate | 304 grams/sec. | | | |
| Mechanical Properties | | | | |
| Compressive Strength | 1037 psi | | | |
| Compressive Modulus | 3.67 ksi | | | |
| Tensile Strength | 2034 psi | | | |
| Tensile Modulus | 17.14 ksi | | | |
| Elongation at break | 80% | | | |
| Fatigue (Endurance Testing) | 25000 cycles | | | |

*To be run on every batch

Procedure:

Open the 55-gal drum of Item 1 and place a drum mixer in it. Start the mixer and go weigh out Items 2, 3, 4, 5, 6, 7 and 8 in separate containers. It is best to weigh items 2 and 3 in 100 mL syringes and items 4 and 5 in plastic quart cups. Add each ingredient to the drum of material while the mixer is mixing. Mix for 2 hours after the final item is added.

An example of an endurance testing procedure is as follows: a drum mixer is mounted on a chassis. The drum mixer is rotated at a rate of 25,000 cycles/day, (e.g. about 17 revs/minute). The running temperature is between 90° F. to 100° F. The mixer is loaded with about 28,000 lbs of 1.5" crushed granite flooded with water. A strain gauge is mounted on the outer shell of the drum to measure deformation during fatigue and compared versus finite element analysis for structural integrity. The thickness of the spiral mixing vane within the drum is measured about every 250,000 cycles. The life cycle of a steel drum is believed to be about 1.2 MM cycles. The Applicants believe that the life of a composite drum of this current innovation technology should exceed about 2 MM cycles.

Figure 7:
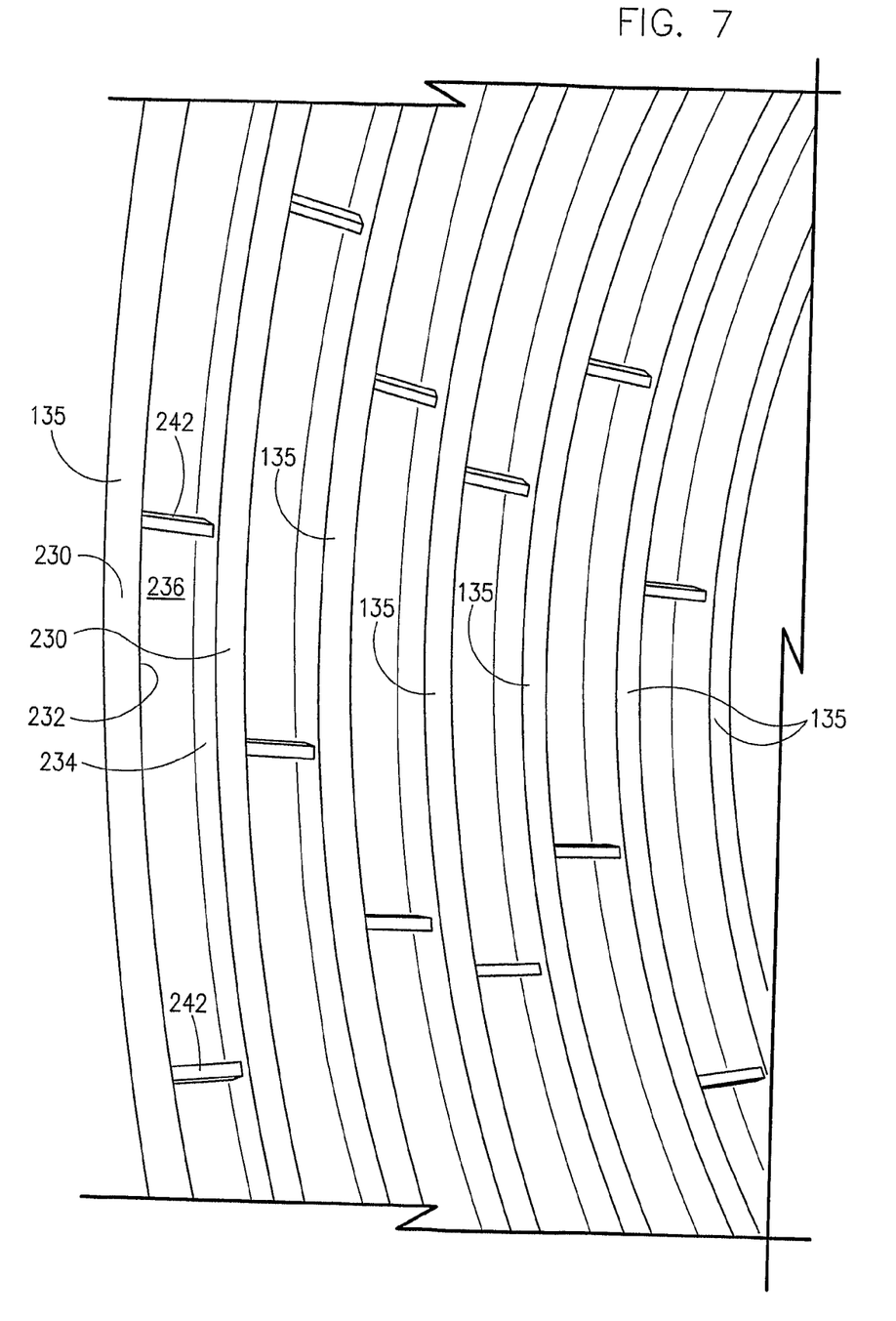
FIG. 7 is a perspective view of a stack of exemplary roller rings.
Figure 8:
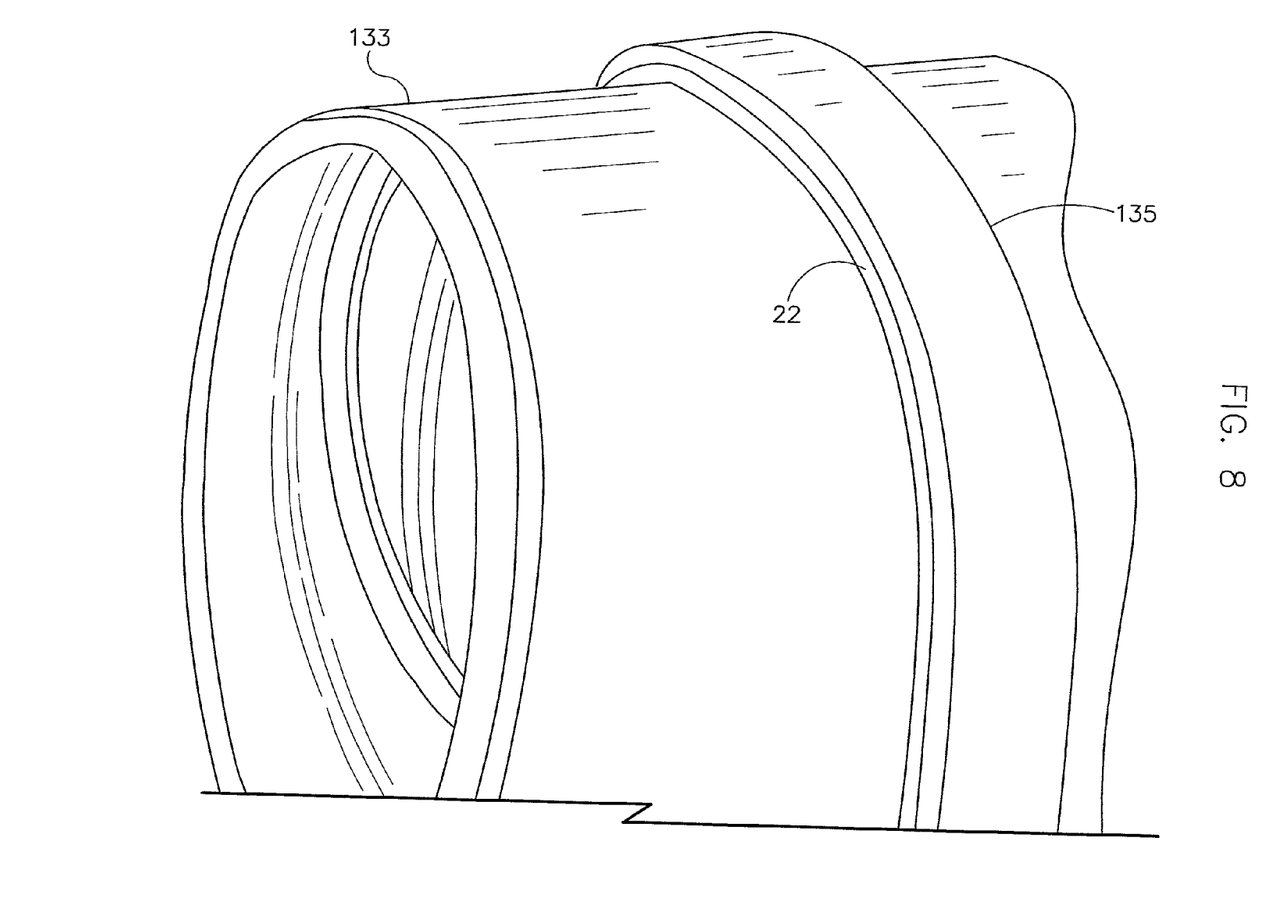
FIG. 8 is a perspective view illustrating one of the roller rings of FIG. 7 secured to the barrel of FIG. 1.
Figure 9:
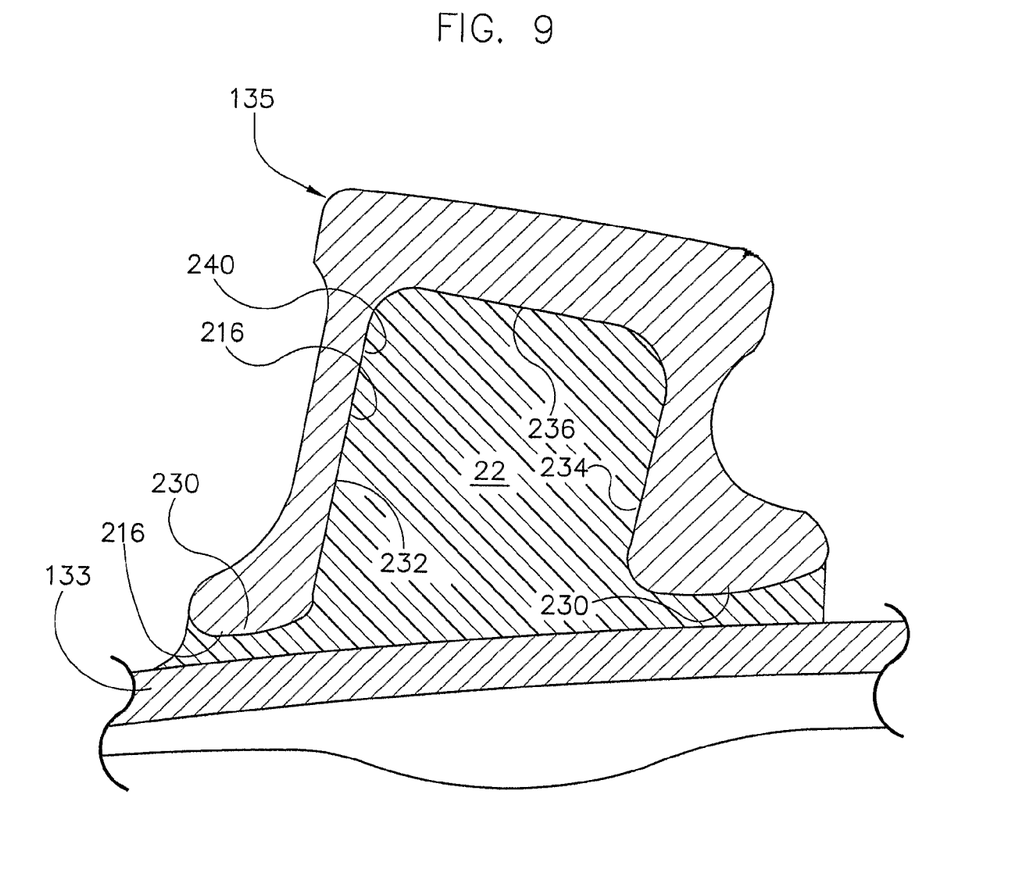
FIG. 9 is a fragmentary sectional view of the roller ring secured to the barrel of FIG. 8 taken along line 9-9.

FIGS. 7-9 illustrate one particular example of roller ring 135 (FIG. 7) and its securement to barrel 133 by binder 22 (FIGS. 8 and 9). FIG. 7 illustrates a stack of six individual roller rings 135 prior to being secured to barrel 133. As shown by FIG. 7, each roller ring 135 is formed from a metallic material, such as aluminum, and has a generally inverted U-shaped cross-section. In the particular embodiment shown, each roller ring 135 has a Π shaped configuration. As shown by FIG. 9, each roller ring 135 includes an interface opposite to barrel 133 by providing multiple surfaces 230, 232, 234 and 236 against which binder 22 is solidified after being injected into gap 216. Surfaces 230 face the exterior surface of barrel 133. Surfaces 232 and 234 extend in a non-parallel direction away from surface 230. Surface 236 interconnects surfaces 232 and 234 to form an inverted U-shaped channel 240 which forms part of gap 216.

As shown by FIG. 7, each roller ring 135 additionally includes multiple spaced rib structures 242 which span channel 240. In particular, each rib structure 242 extends between surface 232 and 234 while being spaced from surface 236. In one embodiment, structures 242 comprise bars or rods having opposite ends secured to surface 232 and 234 such as by welding or such as being integrally cast as part of an integral unitary body with the remainder of roller ring 135. Structures 242 strengthen roller ring 135 by further rigidifying surfaces 232 and 234. At the same time, each rib structure 242 provides a mechanical interlock between roller ring 135 and binder 22. In particular, during its injection into gap 216 and into channel 240, binder 22 flows completely about each rib structure 242 to encapsulate each rib structure 242. Upon solidification while in contact with rib structure 242, binder 22 locks roller ring 135 in place.

In other embodiments, rib structure 242 may have other shapes and configurations. For example, in other embodiments, rib structure 242 may alternatively project from surface 236 and include a narrow neck portion and an enlarged head portion about which binder 22 may flow and be solidified to mechanically capture or lock to roller ring 135. In other embodiments, rib structure 242 may be omitted.

As shown by FIG. 9, binder 22, upon being solidified, substantially if not completely fills gap 216 including channel 240. Binder 22 extends between and is in simultaneous contact with both surfaces 230 and the exterior surface of barrel 133. Binder 22 is also in simultaneous contact with surface 236 and the opposite exterior surface of barrel 133. In addition, binder 22 is in simultaneous contact with surfaces 232 and 234 as well as in contact with rib structures 242 (shown in FIG. 7). As a result, binder 22 has a relatively large area of surface contact with roller ring 135 and with barrel 133 to securely retain roller ring 135 to barrel 133. In addition, because binder 22 entirely fills gap 216, voids where corrosion or material degradation may occur, are reduced or eliminated. As noted above, because binder 22 is solidified under compression between barrel 133 and roller ring 135, binder 22 automatically and naturally expands to accommodate movement of roller ring 135 relative to barrel 133 caused by different coefficients of thermal expansion or uneven load distribution.

In the example shown in FIGS. 6-9, binder 22 is illustrated as securing roller ring 135 about and to barrel 133. In other embodiments, binder 22 may be used to secure rings or other annular members about and to other structures such as bins, fluid tanks, gas tanks and the like. In other embodiments, binder 22 may also be used to secure other bands or ring-like structures (not necessarily circular or annular) about other structures or within and to other structures. In lieu of securing a first member and a second member to one another, wherein one of the members encircles or extends completely about the other, binder 22 may also be used to secure other adjacent or side-by-side structures. For example, binder 22 may be used to secure structures having interfaces or surfaces that extend opposite to one another or that extend perpendicular or oblique to one another.

Figure 10A:
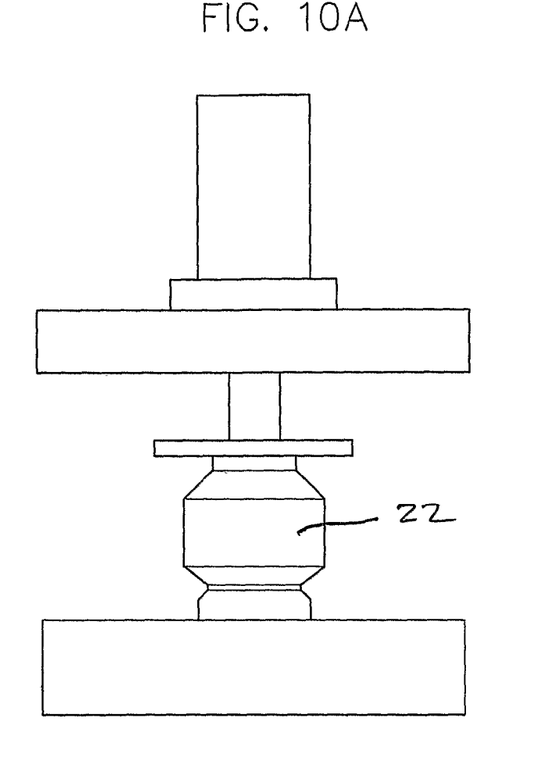
FIGS. 10A and 10B are schematic representations of a compression set test to evaluate compression fatigue properties of a micro-cellular polyurethane elastomer for the binder.
Figure 10B:
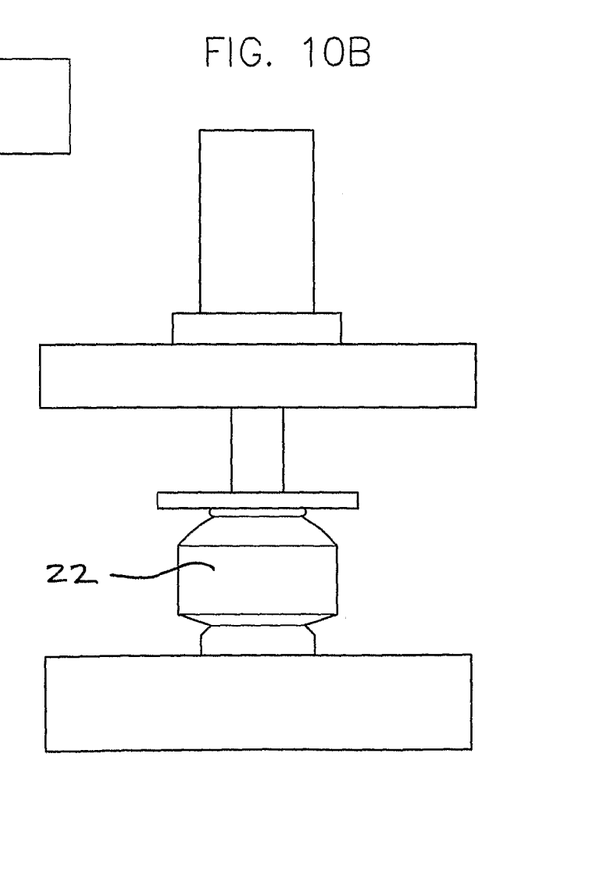

In the example shown in FIGS. 10A and 10B, binder 22 has been molded in the form of a suspension jounce bumper to test its compression set value. A binder 22 was developed with several compression set values ranging from about 4 to 1.68% at 25% deflection and compressed for 22 hours at room temperature and about 50% relative humidity. The Applicant has found that a binder with a compression set higher than about 3.5% tends to fail in fatigue (after about 25,000 cycles), whereas a binder that had a compression set of about 2.68% successfully endured more than 3 MM cycles in fatigue without failure. The Applicant believes that the compression set property of the binder tends to show the ability for a polymer to absorb and release energy (shock absorber effect) with a minimal of permanent deformation. A permanent deformation may be considered as shrinkage caused by fatigue. Shrinkage tends to increase the interface stress between the micro-cellular polymer binder material and the substrate, which tends to weaken the bond strength.

Figure 11A:
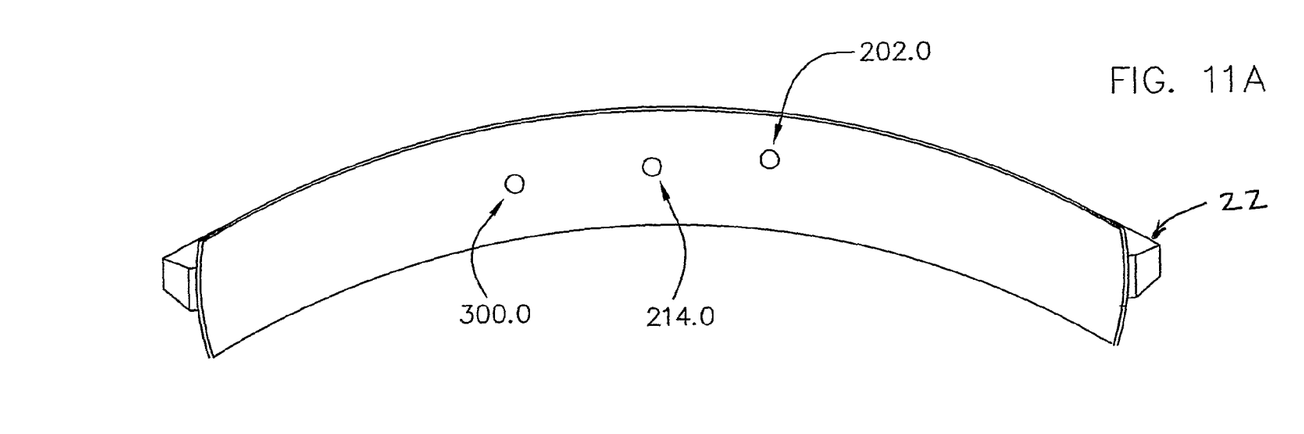
FIGS. 11A and 11B are schematic representations of a finite element analysis displaying exemplary reduction in stress levels at an interface between the binder material and a drum surface from a first condition where the binder material is bonded at an interface with the roller ring, and a second condition where the binder material is de-bonded at the interface with the roller ring.
Figure 11B:
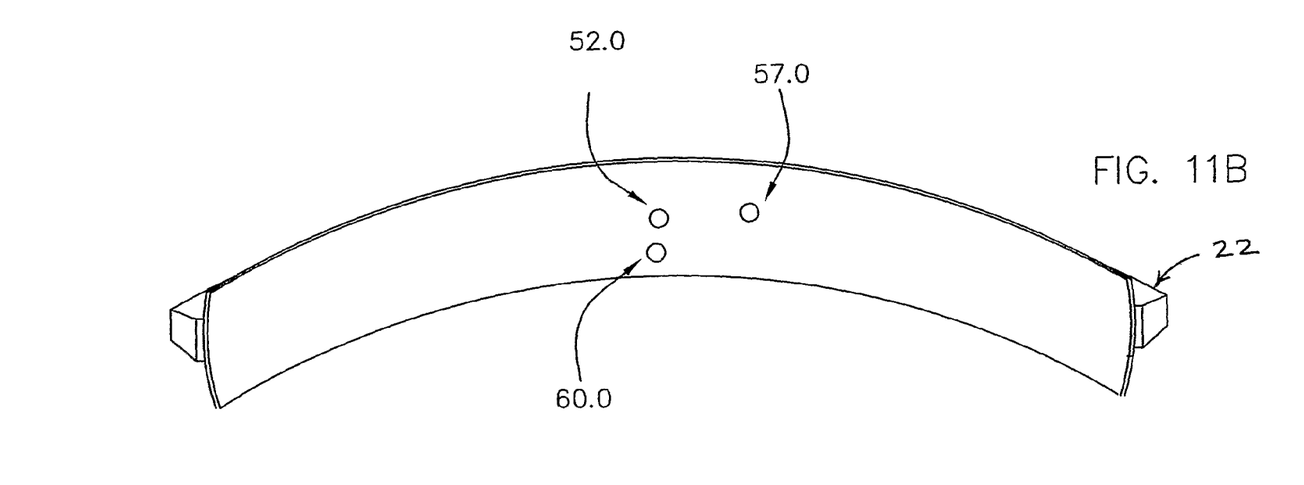

In the example shown in FIGS. 11A and 11B, binder 22 may exercise stress at the interface 135 and/or 133 if the binder material is well-bonded at both interfaces according to the Applicant' finite element analysis, and is believed to be due to thermal shrink caused by the exothermic reaction (e.g. about 0.5% thermal shrinkage). The Applicant believes the resulting stress with both interfaces bonded to the binder material can be as much as 300 psi (pounds per square inch) (as shown in the representative image of FIG. 11A), whereas, if the binder material is intentionally "de-bonded" at one interface, the stress level at the surface of the opposite interface will be substantially reduced (e.g. a stress reduction from about 300 psi to about 60 psi) (as shown in the representative image of FIG. 11B). According to one embodiment of a commercial drum mixer, it would be desirable to enhance the interface properties of the interface 133 at the surface of the drum (i.e. drum composite surface). In order to obtain stress reduction between the binder material and drum interface 133, the Applicant believes that de-bonding the interface 135 between the binder material and the roller ring can be very promising. One way of accomplishing the de-bonding at interface 135 is to coat a steel roller ring with a de-bonding agent, such as a primer, and to pre-cure the primer before injecting the binder material into the cavity between the roller ring and the drum surface. According to other embodiments, other materials and processes may be used to effectively de-bond the interface.

Figure 12A:
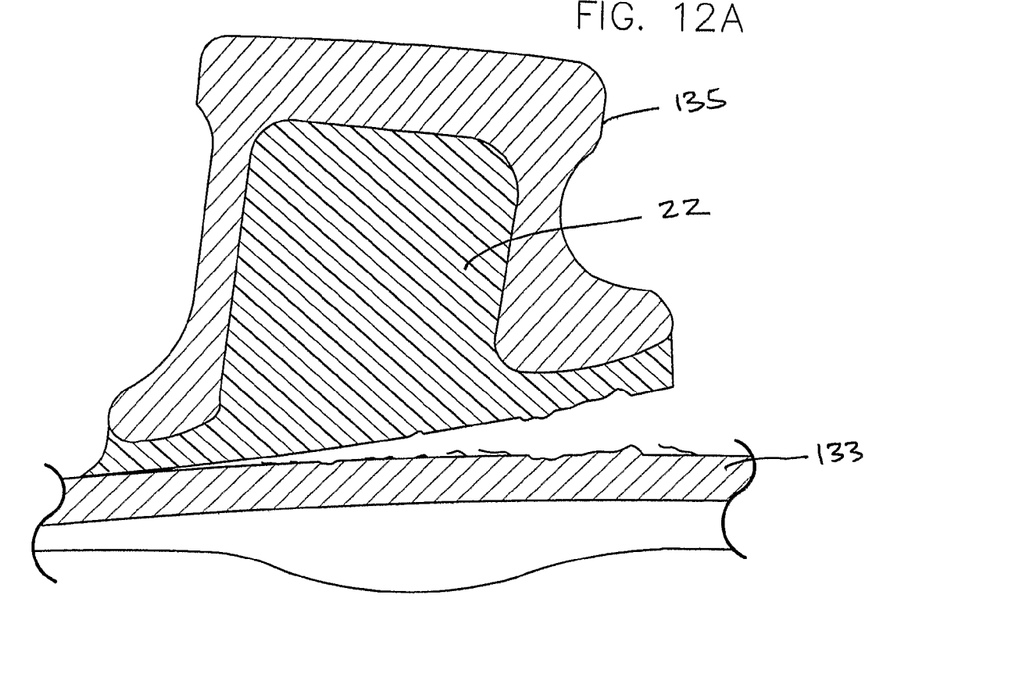
FIGS. 12A and 12B are schematic representations of the effect of an exemplary bond strength at the interface between the binder material and the drum surface in a first condition with a coupling agent, and in a second condition without a coupling agent (e.g. an epoxy coupling agent on the drum surface).
Figure 12B:
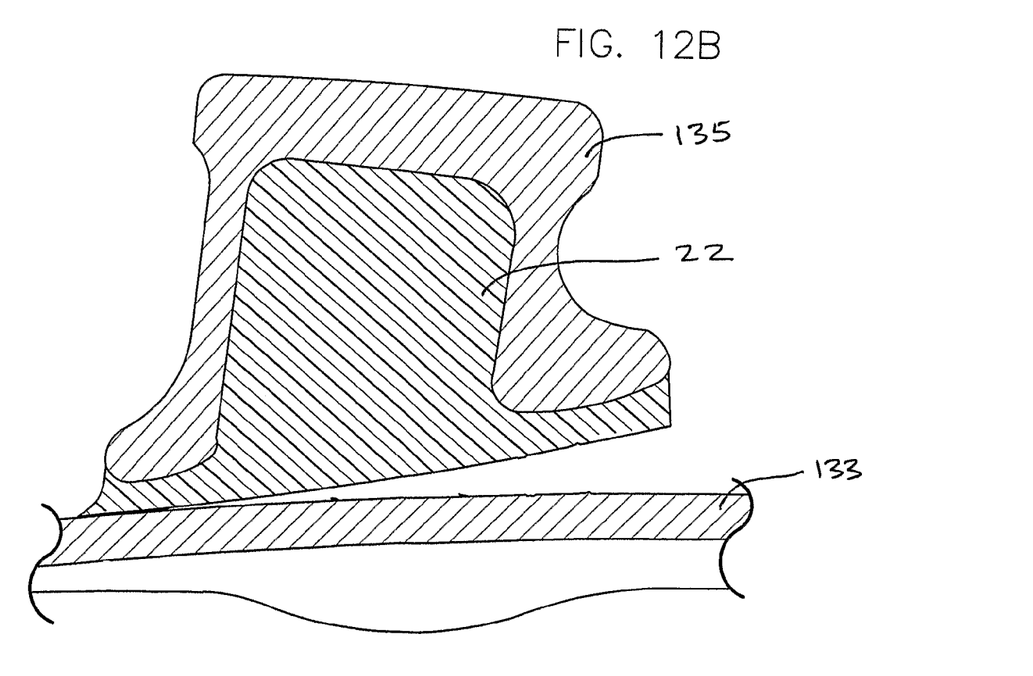

Referring to FIGS. 12A and 12B, a coupling agent may be used to enhance adhesion between the binder material of the joint and the surface of the drum at interface 133. By way of example, the Applicants have found that use of an epoxy coupling agent on the drum surface resulted in an interface tension adhesion strength between the roller ring and the drum surface of about 700 psi was obtainable (see FIG. 12B in which detachment of the roller ring from a drum surface resulted in delamination of portions of the drum surface interface). In contrast, the Applicants have found that without use of a coupling agent, a reduction in interface tension adhesion strength between the roller ring with binder material and the drum surface of about 300 psi was obtained (see FIG. 12A in which detachment of a roller ring from a drum surface resulted in minimal delamination of the drum surface interface.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A concrete mixing drum apparatus comprising:
   an inner drum layer comprising two spiral shaped sections that are mated together;
   an outer drum layer disposed over the inner drum layer and defining a first interface;
   a ring disposed about the outer drum layer and defining a second interface;
   a binder injected between the first interface and the second interface; and
   expanded and solidified against the first interface and the second interface.

2. The apparatus of claim 1, wherein the binder is closed-celled.

3. The apparatus of claim 1, wherein the binder has a minimum free rise density of about 0.45 g/cc. and a maximum in mold density of about 1.0 g/cc.

4. The apparatus of claim 1, wherein the binder includes a first material and microfibers.

5. The apparatus of claim 1, wherein the binder is completely cured while being against the first interface and the second interface.

6. The apparatus of claim 1, wherein the solidified binder between the first and second interface has a compression of less than or equal to about 3.5 percent.

7. The apparatus of claim 1 wherein the two spiral shaped sections each include an integrally formed mixing vane projection extending therefrom.

8. The apparatus of claim 7 wherein the ring providing the second interface comprises a roller ring having an internal cavity.

9. The apparatus of claim 1, wherein the first interface is provided by an external surface of the outer drum layer having a first coefficient of thermal expansion and wherein the second interface is provided by an internal surface of the ring having a second distinct coefficient of thermal expansion.

10. The apparatus of claim 1, wherein the second interface includes a cavity in the ring opposite the first interface and wherein the solidified binder completely fills the cavity.

11. The apparatus of claim 10 wherein the ring includes a structure extending from a first side of the cavity to a second opposite side of the cavity, wherein the binder is cellular and its percent ratio of free rise density to its in mold density is 33% to 47%, where its free rise density ranges from 0.48 to 0.6 g/cc and its maximum in mold density is 0.9 g/cc.

12. The apparatus of claim 1, wherein the first interface of the outer drum layer is formed from a non-metallic material and wherein the second interface of the ring is formed from a metallic material.

13. The apparatus of claim 1, wherein the binder is formed from a combination of polyisocyanate, a polyol and a nucleation agent.

14. The apparatus of claim 1, wherein the binding agent is formed from a combination of a polyisocyanate, a polyol and a thixotropic ingredient.

15. The apparatus of claim 14, wherein the thixotropic ingredient comprises milled fiber.

16. The apparatus of claim 1, wherein the binding agent is formed from a combination of a polyisocyanate, a polyol and water.

* * * * *